US011203396B2

United States Patent
Yamamoto et al.

(10) Patent No.: US 11,203,396 B2
(45) Date of Patent: Dec. 21, 2021

(54) BICYCLE DRIVE UNIT

(71) Applicant: Shimano Inc., Osaka (JP)

(72) Inventors: Takashi Yamamoto, Osaka (JP); Hiroyuki Urabe, Osaka (JP); Yusuke Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 1396 days.

(21) Appl. No.: 15/054,877

(22) Filed: Feb. 26, 2016

(65) Prior Publication Data

US 2016/0280328 A1    Sep. 29, 2016

(30) Foreign Application Priority Data

Mar. 25, 2015    (JP) .............................. JP2015-063155

(51) Int. Cl.
*F16H 3/72*    (2006.01)
*B62M 6/55*    (2010.01)
*B62M 11/14*    (2006.01)
*B62M 6/40*    (2010.01)
*F16D 41/30*    (2006.01)

(52) U.S. Cl.
CPC .............. *B62M 11/14* (2013.01); *B62M 6/55* (2013.01); *B62M 11/145* (2013.01); *B62M 6/40* (2013.01); *F16D 41/30* (2013.01)

(58) Field of Classification Search
None
See application file for complete search history.

(56) References Cited

U.S. PATENT DOCUMENTS

2011/0195813 A1    8/2011    Yoo et al.
2013/0095971 A1*   4/2013    Hino ..................... B62M 11/04
                                                                  475/5

FOREIGN PATENT DOCUMENTS

| CN | 102762441 A | 10/2012 |
| DE | 102004045364 A1 | 3/2006 |
| EP | 1445088 A2 | 8/2004 |
| FR | 795941 A | 3/1936 |
| JP | 11-180376 A | 7/1999 |
| JP | 4056130 B2 | 3/2008 |
| JP | 2011-162184 A | 8/2011 |
| JP | 5523636 B1 | 6/2014 |
| WO | 2012066124 A1 | 5/2012 |

\* cited by examiner

*Primary Examiner* — Charles A Fox
*Assistant Examiner* — Ryan P Dodd
(74) *Attorney, Agent, or Firm* — Global Counselors, LLP

(57) ABSTRACT

A bicycle drive unit is basically provided with an input rotational shaft, an output part, a transmission mechanism, an assist motor and a switching mechanism. The transmission mechanism has at least two shift stages, and is configured to change a speed of a rotational input that is input from the input rotational shaft and output this rotational input to the output part. The assist motor is coupled to a power transmission path from the input rotational shaft to the output part, and is driven according to a manual drive force. The switching mechanism is configured to switch a gear changing state of the transmission mechanism by using a rotational force of the assist motor.

23 Claims, 8 Drawing Sheets ial Patent Appli-
BICYCLE DRIVE UNIT

CROSS-REFERENCE TO RELATED APPLICATIONS

This application claims priority to Japanese Patent Application No. 2015-063155, filed on Mar. 25, 2015. The entire disclosure of Japanese Patent Application No. 2015-063155 is hereby incorporated herein by reference.

BACKGROUND

1. Field of the Invention

This invention generally relates to a bicycle drive unit.

2. Background Information

A bicycle drive unit is described in Japanese Patent No. 5,523,636 that comprises a transmission mechanism that can reduce the speed of a rotation input to a crankshaft and output this rotation to an output part, as well as a switching mechanism for switching between a state in which the crankshaft and the output part are connected and a state in which the connection between the crankshaft and the output part is released. When the switching mechanism is in a state in which the crankshaft and the output part are released, the rotation that is input to the crankshaft is decelerated by the transmission mechanism and is output to the output part. When the switching mechanism is in a state in which the crankshaft and the output part are connected, the rotation that is input to the crankshaft is output to the output part without being decelerated by the transmission mechanism. That is, the bicycle drive unit is able to obtain two transmission ratios with the switching mechanism.

SUMMARY

Generally, the present disclosure is directed to various features of a drive unit.

With the transmission mechanism of the conventional drive unit described above, as the amount of torque that is applied to the switching mechanism increases, the more difficulty the switching mechanism has in releasing the connection between the crankshaft and the output part. For this reason, the transmission performance degrades.

An object of the present invention is to provide a bicycle drive unit that is able to improve the shifting performance.

In view of the state of the known technology and in accordance with a first aspect of the present disclosure, a drive unit is provided that basically comprises an input rotational shaft, an output part, a transmission mechanism, an assist motor and a switching mechanism. The transmission mechanism has at least two shift stages and is configured to change a speed of a rotational input that is input from an input rotational shaft and output the rotational input to the output part. The assist motor is connected to a power transmission path from the input rotational shaft to the output part and is driven according to a manual drive force. The switching mechanism is configured to switch a gear changing state of the transmission mechanism by using a rotational force of the assist motor.

In accordance with a second aspect of the present invention, the bicycle drive unit is configured so that at least a part of the switching mechanism is coupled to the transmission path between the assist motor and the output part.

In accordance with a third aspect of the present invention, the bicycle drive unit is configured so that the transmission mechanism comprises a planetary gear mechanism.

In accordance with a fourth aspect of the present invention, the bicycle drive unit is configured so that the planetary gear mechanism comprises an input body that is rotatably supported by a support member and to which the rotational input of the input rotational shaft is input, an output body that is rotatably supported by the support member and outputs the rotational input to the outside, and a transmission body. The switching mechanism further comprises a one-way clutch that is provided between the input body and the output body and that controls a rotation of the transmission body.

In accordance with a fifth aspect of the present invention, the bicycle drive unit is configured so that the one-way clutch integrally rotates the input body and the output body when a rotational speed of the input body in one direction is equal to or greater than a rotational speed of the output body in one direction; when the rotational speed of the input body in one direction is less than the rotational speed of the output body in one direction, a relative rotation between the input body and the output body is permitted.

In accordance with a sixth aspect of the present invention, the bicycle drive unit is configured so that the support member can be integrally rotated with the transmission body, and the switching mechanism comprises a connecting part and a control unit. The connecting part is provided to the transmission body or to an opposing portion that opposes the transmission body, and is movably disposed between a protruding position in which the rotation of the transmission body is regulated in at least one direction and a retracted position in which the rotation of the transmission body is not regulated. The control unit moves the connecting part from the protruding position to the retracted position by using the rotational force of the assist motor.

In accordance with a seventh aspect of the present invention, the bicycle drive unit is configured so that control unit presses the connecting part and moves this from the protruding position to the retracted position.

In accordance with an eighth aspect of the present invention, the bicycle drive unit is configured so that a plurality of the connecting parts is provided around a rotational axis of the support member.

In accordance with a ninth aspect of the present invention, the bicycle drive unit is configured so that the control unit comprises an annular member, which can be integrally rotated with the output body and which comprises a groove that becomes shallower in a radial direction toward one circumferential direction, in a portion that opposes the connecting part.

In accordance with a tenth aspect of the present invention, the bicycle drive unit is configured so that the assist motor is connected to the output body or on an upstream side of the output body on the power transmission path.

In accordance with an eleventh aspect of the present invention, the bicycle drive unit is configured so that the transmission body comprises a sun gear, which integrally rotates with the support member. The output body comprises a ring gear, which is disposed coaxially around the sun gear. The input body comprises a carrier, which is disposed between the sun gear and the ring gear and which integrally rotates a plurality of planetary gears.

In accordance with a twelfth aspect of the present invention, the bicycle drive unit is configured so that the connecting part is provided to the support member.

In accordance with a thirteenth aspect of the present invention, the bicycle drive unit is configured so that the transmission mechanism comprises a plurality of rotating bodies comprising a rotating body to be controlled. The switching mechanism comprises a connecting part and a control unit. The connecting part is provided to the rotating body to be controlled or to an opposing portion that opposes the rotating body to be controlled and is movably arranged between a protruding position in which the rotation of the rotating body to be controlled is regulated in at least one direction and a retracted position in which the rotation of the rotating body to be controlled is not regulated. The control unit moves the connecting part from the protruding position to the retracted position by using the rotational force of the assist motor.

In accordance with a fourteenth aspect of the present invention, the bicycle drive unit is configured so that the control unit presses the connecting part and moves the connecting part from the protruding position to the retracted position.

In accordance with a fifteenth aspect of the present invention, the bicycle drive unit is configured so that a plurality of the connecting parts is provided around a rotational axis of the rotating body to be controlled.

In accordance with a sixteenth aspect of the present invention, the bicycle drive unit is configured so that the control unit comprises an annular member, which can be integrally rotated with one other rotating body, excluding the rotating body to be controlled, from among the plurality of rotating bodies included in the transmission mechanism. The control unit comprises an annular member comprising a groove that becomes shallower in a radial direction toward one circumferential direction, in a portion that opposes the connecting part.

In accordance with a seventeenth aspect of the present invention, the bicycle drive unit is configured so that the assist motor is connected to the one other rotating body or on the upstream side of the one other rotating body on the power transmission path.

In accordance with an eighteenth aspect of the present invention, the bicycle drive unit is configured so that the annular member presses the connecting part radially inward.

In accordance with a nineteenth aspect of the present invention, the bicycle drive unit is configured so that the connecting part comprises a pawl member.

In accordance with a twentieth aspect of the present invention, the bicycle drive unit is configured so that the control unit further comprises a cam for moving the annular member in a rotational axis direction and an electric motor for driving the cam.

In accordance with a twenty-first aspect of the present invention, the bicycle drive unit is configured so that the input rotational shaft is a crankshaft to which a manual drive force is input.

In accordance with a twenty-second aspect of the present invention, the bicycle drive unit according to the twenty-first is configured so that the assist motor is disposed radially outside of the crankshaft.

In accordance with a twenty-third aspect of the present invention, the bicycle drive unit is configured so that the transmission mechanism comprises a first rotating body, a second rotating body, a third rotating body and a fourth rotating body. The first rotating body is integrally rotated with the input rotational shaft. The second rotating body is integrally rotated around an axis whose position, with respect to the input rotational shaft, does not change and to which a rotation of the first rotating body is transmitted. The third rotating body is integrally rotated with the second rotating body. The fourth rotating body to which the rotational force of the third rotating body is transmitted and is integrally rotated with the output part. The switching mechanism comprises a connecting part and a control unit. The connecting part is provided to an opposing portion that opposes one of the second rotating body and the third rotating body and which can be moved between a protruding position in which a rotation of one of the second rotating body and the third rotating body is regulated in at least one direction and a retracted position in which the rotation of one of the second rotating body and the third rotating body is not regulated. The control unit is configured to move the connecting part from the protruding position to the retracted position by using the rotational force of the assist motor.

The bicycle drive unit described above can improve the transmission performance.

Also other objects, features, aspects and advantages of the disclosed drive unit will become apparent to those skilled in the art from the following detailed description, which, taken in conjunction with the annexed drawings, discloses one illustrative embodiment of the bicycle drive unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
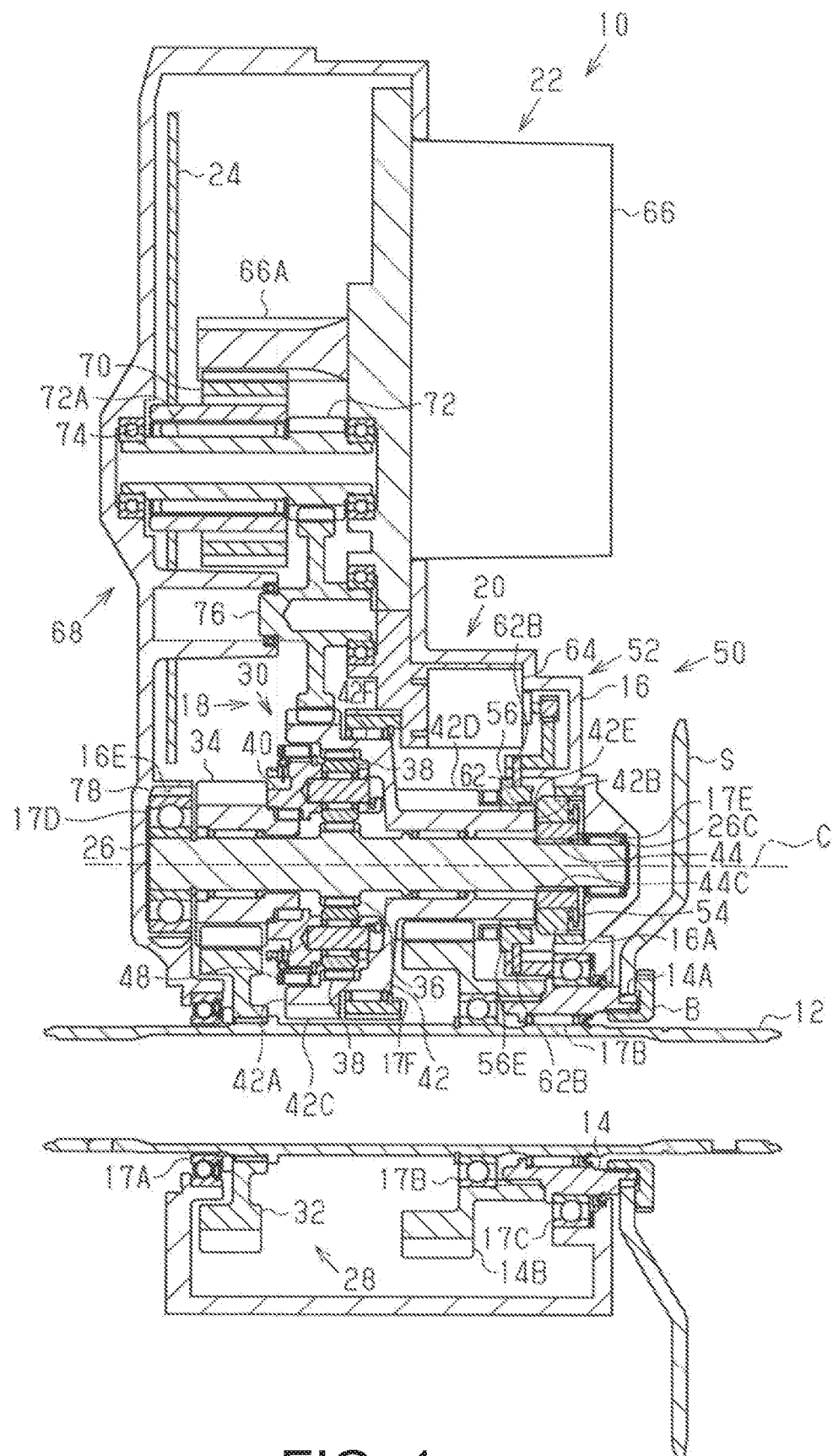
FIG. 1 is a cross-sectional view of a bicycle drive unit in accordance with a first embodiment.

Referring initially to FIGS. 1 to 11, a drive unit 10 is illustrated in accordance with a first embodiment. As shown in FIG. 1, the drive unit 10 comprises an input rotational shaft 12, an output part 14, a housing 16, a transmission mechanism 18, a switching mechanism 20, an assist mechanism 22 and a control unit 24. Here, in the first embodiment, the input rotational shaft 12 is a bicycle crankshaft that receives a pedal force from a rider. The output part 14 is configured to output the rotational input from the input rotational shaft 12 to a sprocket S. The housing 16 rotatably supports the rotational shaft 12 and the output part 14. The transmission mechanism 18 is configured to output the rotational input that is inputted from the input rotational shaft 12 to the output part 14 based on an operative state of the switching mechanism 20. Preferably, the drive unit 10 further comprises a torque sensor 78, which will be discussed below.

The housing 16 is attached to a bicycle frame (not shown). The housing 16 houses a part of the input rotational shaft 12, apart of the output part 14, the transmission mechanism 18, the switching mechanism 20, a part of the assist mechanism 22, and the control unit 24.

The input rotational shaft 12 is rotatably supported by the housing 16. The two ends of the input rotational shaft 12 are exposed to the outside of the housing 16. A crank arm (not shown) can be attached to each end of the input rotational shaft 12. In this way, a manual drive force is inputted via the crank arms to the input rotational shaft 12. The input rotational shaft 12 can be a hollow shall The housing 16 rotationally supports a first outer axial end part of the input rotational shaft 12 via a bearing 17A. The output part 14 rotationally supports a second outer axial end part of the input rotational shaft 12 by a second bearing 1713.

The output part 14 has a tubular shape, i.e., a tubular shaft. The output part 14 is coaxially disposed around the input rotational shaft 12. A first end of the output part 14 is exposed to the outside of the housing 16. A second end of the output part 14 has a plurality of gear teeth 14B. An outer peripheral part of a center portion of the output part 14 is supported by the housing 16 via a bearing 17C. The output part 14 comprises an attaching portion 14A that is configured to be attached to an inner peripheral part of the sprocket S. The attaching portion 14A is coaxially disposed at one axial end of the input rotational shaft 12. The attaching portion 14A has a plurality of splines on its outer peripheral surface. The sprocket S has a plurality of splines formed on an inner periphery that is fitted onto the splines of the attaching portion 14A. The sprocket S is retained on the output part 14 by a bolt B that is screwed into an inner peripheral part of the output part 14. In this way, the sprocket S is sandwiched between the output part 14 and the bolt B. The output part 14 can be configured to be divided in an axial direction with respect to the rotational axis of the input rotational shaft 12.

The transmission mechanism 18 comprises a transmission shaft 26, a transmission mechanism 28, and a planetary gear mechanism 30. The transmission shaft 26 is a support member. The transmission shaft 26 is rotating body. The transmission mechanism 18 comprises two shift stages and can change the input rotational speed that is input from the input rotational shaft 12 and that is outputted to the output part 14.

The transmission shaft 26 is disposed radially outward of the input rotational shaft 12 with respect to a radial direction of the rotational axis of the input rotational shaft 12. The transmission shaft 26 is arranged parallel to the input rotational shaft 12. The transmission shaft 26 is rotatably supported by the housing 16. Both axial ends of the transmission shaft 26 are supported by the housing 16 via a pair of bearings 17D and 17E, at two axially spaced apart locations, respectively. The transmission shaft 26 is rotatable around a stationary center axis C whose position does not change with respect to the input rotational shaft 12. A first axial end of the transmission shaft 26 is supported by the bearing 17D, which is a ball bearing, while a second axial end of the transmission shaft 26 is supported by the bearing 17E, which is a needle bearing.

The transmission mechanism 28 comprises a first transmission gear 32 and a second transmission gear 34. The first transmission gear 32 is coaxially disposed around the input rotational shaft 12. The second transmission gear 34 is coaxially disposed around the transmission shaft 26.

The first transmission gear 32 includes a plurality of outer gear teeth. The inner periphery of the first transmission gear 32 is non-rotatable supported by the input rotational shaft 12. In other words, the first transmission gear 32 is non-rotatably coupled to the input rotational shaft 12. For example, the first transmission gear 32 is relatively non-rotatable coupled to the input rotational shaft 12 via a spline fit or a press fit.

The second transmission gear 34 includes a plurality of outer gear teeth. The second transmission gear 34 is rotatably supported by the transmission shaft 26 via a bearing or the like. The outer gear teeth of the first transmission gear 32 meshes the outer gear teeth of the second transmission gear 34. For this reason, the rotation of the input rotational shaft 12 is transmitted to the second transmission gear 34 via the first transmission gear 32.

The planetary gear mechanism 30 comprises a sun gear 36, a plurality of planetary gears 38, a carrier 40 and a ring gear 42. The sun gear 36 constitutes a transmission body. The carrier 40 constitutes is an input body. The ring gear 42 constitutes an output body. The carrier 40 also constitutes a first rotating body, while the ring gear 42 also constitutes a second rotating body.

The sun gear 36 is coaxially disposed around the transmission shaft 26. The sun gear 36 is integrated with the transmission shaft 26. For this reason, the transmission shaft 26 can be integrally rotated with the sun gear 36.

The planetary gears 38 are disposed around the sun gear 36. The planetary gears 38 are operatively disposed between the sun gear 36 and the ring gear 42. The teeth of the planetary gears 38 mesh with the outer gear teeth of the sun gear 36 and the inner gear teeth of the ring gear 42.

The carrier 40 rotatably supports the planetary gears 38 and integrally rotates the planetary gears 38 around the sun gear 36. A first axial end of the carrier 40 of the transmission shaft 26 is joined with the first transmission gear 32 via spline fit, a press fit, or the like. In this way, the carrier 40 can be integrally rotated with the first transmission gear 32. In other words, the carrier 40 is rotatably supported by the transmission shaft 26 via the first transmission gear 32. The rotation of the input rotational shaft 12 is input to the carrier 40 via the first transmission gear 32.

The ring gear 42 is coaxially disposed around the sun gear 36. The ring gear 42 comprises a first end 42A on a side that is joined with the planetary gear 38 with respect to the axial direction of the transmission shaft 26, as well as a second end 42B on the opposite side of the first end 42A. The first end 42A of the ring gear 42 covers the planetary gears 38. The inner periphery of the second end 42B of the ring gear 42 is rotatably supported by the transmission shaft 26 via a bearing or the like.

The outer periphery of the first end 42A of the ring gear 42A has a plurality first gear teeth 42C. The outer periphery of the second end 42B of the ring gear 42 has a plurality second gear teeth 42D. The second gear teeth 42D meshes with the gear teeth 14B, which are formed on the outer periphery of the output part 14. That is, the ring gear 42 outputs the rotational input to the outside. The number of teeth of the second gear teeth 42D is less than the number of teeth of the first gear teeth 42C. An annular portion 42F is formed between the first gear teeth 42C and the second gear teeth 42D of the ring gear 42. The annular portion 42F is rotatably supported by the housing 16 via a bearing 17F.

The switching mechanism 20 is configured to switch the gear changing state of the transmission mechanism 18. The switching mechanism 20 comprises a retaining member 44, a first biasing member 46 (see FIG. 2), a one-way clutch 48, a connecting part 50, and a control unit 52.

Figures 6, 7:
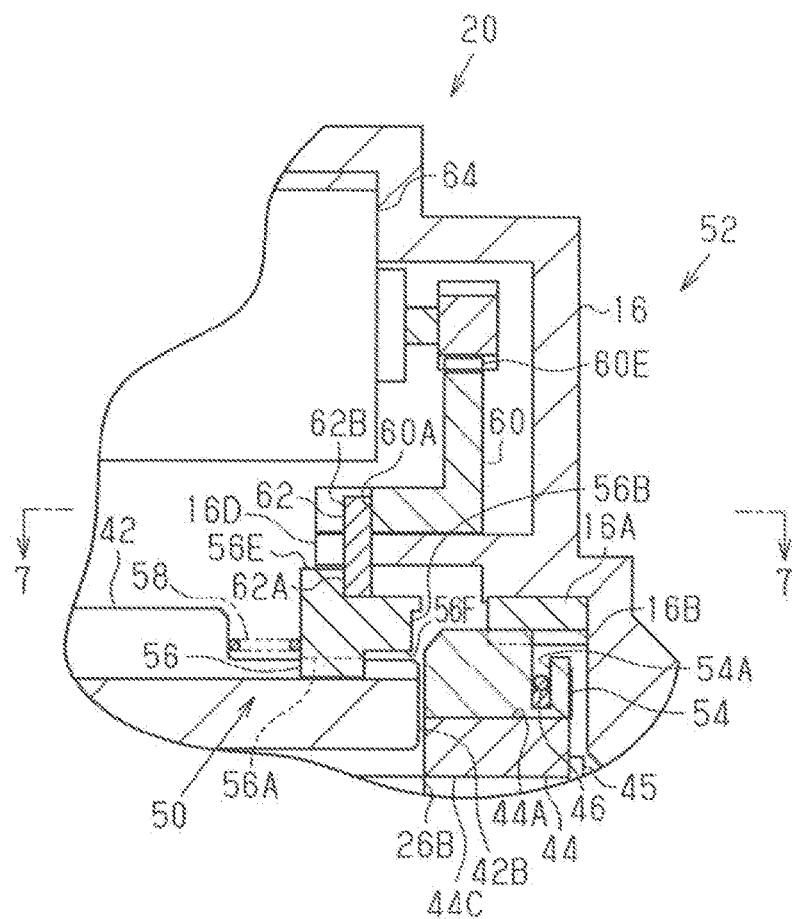
FIG. 6 is an enlarged, partial cross-sectional view of a connecting part of the switching mechanism of FIG. 1 in a protruding position.
FIG. 7 is a cross-sectional view of the connecting part of the switching mechanism as seen along section line 7-7 of FIG. 6.

The retaining member 44 has a cylindrical shape. The retaining member 44 is coaxially disposed around the transmission shaft 26. The retaining member 44 is fixed to the transmission shaft 26 such that the retaining member 44 integrally rotates with the transmission shaft 26. The retaining member 44 comprises a plurality of spline grooves 44C in an inner peripheral part. The spline grooves 44C are engaged with splines defined by a plurality of spline grooves 26C, which are provided on an outer periphery of the transmission shaft 26. This splined engagement of the spline grooves 44C with the splines defined by the spline grooves 26C prevents relative rotation of the transmission shaft with respect to the retaining member 44 around the center axis C. As shown in FIG. 6. The movement of the retaining member 44 in the axial direction is restricted by a fixing member 45 and a stepped portion 26B, which is formed on the transmission shaft 26 by the transmission shaft 26 varying in diameter. The fixing member 45 is formed as, for example, an E ring. The retaining member 44 is disposed in a position adjacent to the second end 42B of the ring gear 42 in the axial direction of the transmission shaft 26.

Figure 2:
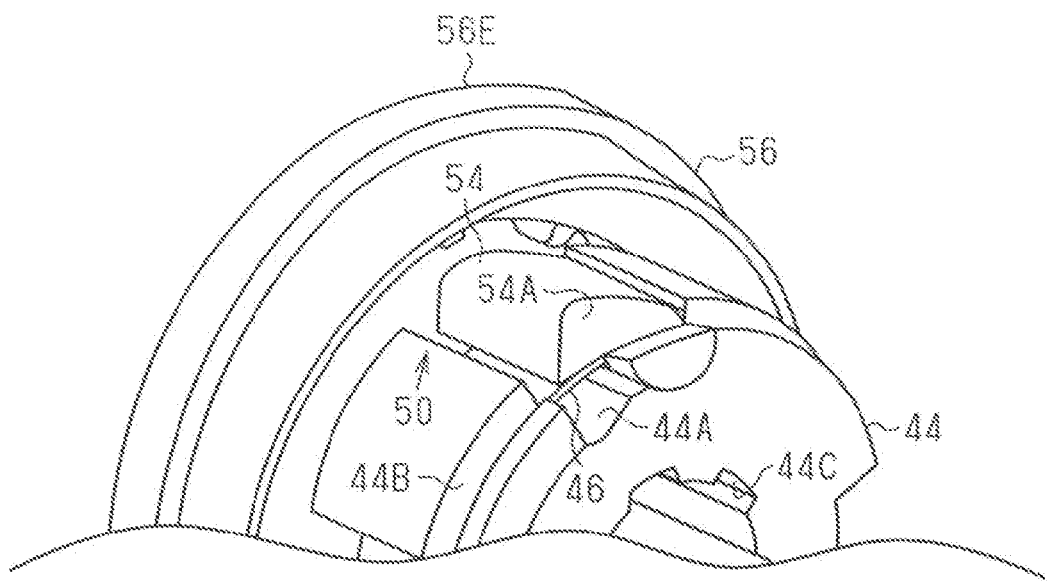
FIG. 2 is a partial perspective view of a switching mechanism of the bicycle drive unit illustrated in FIG. 1.

A plurality of connecting parts 50 shown in FIG. 2 is provided around the rotational axis of the transmission shaft 26 (see FIG. 1). Each of the connecting parts 50 comprises a pawl member 54. Each pawl member 54 is attached to the retaining member 44 so that at least a portion thereof can be housed in a groove 44A, which is formed on the outer peripheral part of the retaining member 44. The end of each pawl member 54 on the opposite side of the ring gear 42 in the axial direction of the transmission shaft 26 opposes the opposing portion 16A of the housing 16 as shown in FIG. 6. The opposing portion 16A comprises an inner peripheral part 16B that is formed in an annular shape around the axis of the transmission shaft 26. The inner peripheral part 16B has a plurality of groove 16C is formed therein. The grooves 16C are spaced apart in the circumferential direction of the inner peripheral part 16B, at predetermined intervals. Each of the grooves 16C has the same shape as a so-called ratchet groove. Each of the pawl members 54 is housed in one of the grooves 44A of the retaining member 44 and at least partially protrudes from its respective one of the grooves 44A. In this way, the pawl members 54 can be moved between a joining position that joins with the grooves 16C and a retracted position that separates from the grooves 16C of the opposing portion 16A. The joining position in the present embodiment corresponds to the protruding position.

The opposing portion 16A can be integrally formed to the housing 16 or can be formed as a separate body from the main body of the housing 16. The opposing portion 16A is preferably formed of metal. In the case that the opposing portion 16A is formed as a separate body from the main body of the housing 16, a mounting portion is formed for mounting the opposing portion 16A in the inner peripheral part of the main body of the housing 16 and for preventing the opposing portion 16A from rotating around the center axis C (see FIG. 1). The main body of the housing 16 can be formed from resin or metal.

The first biasing member 46 is an annular spring. The first biasing member 46 is fitted into a groove 54A, which is formed on the outer surfaces of each of the pawl members 54, and into a circumferential groove 44B (see FIG. 2), which is formed on the outer periphery of the retaining member 44. The first biasing member 46 applies a force on each of the pawl members 54 to bias each of the pawl members 54 toward the joining position.

The control unit 52 comprises an annular member 56, a second biasing member 58, a cam 60, a coupling body 62, and an actuator 64. The cam 60 is configured to move the annular member 56 in the axial direction of the transmission shaft 26. The actuator 64 is configured to drive the cam 60. The actuator 64 is, for example, an electric motor.

Figure 3:
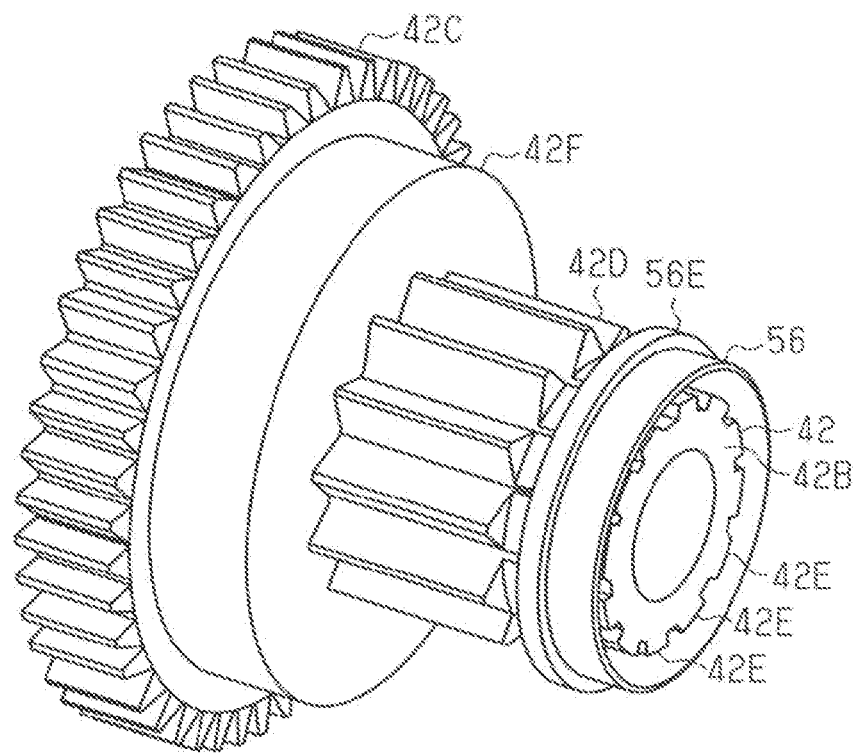
FIG. 3 is a perspective view of a ring gear and an annular member of the bicycle drive unit illustrated in FIG. 1.

As shown in FIG. 3, the annular member 56 is coaxially disposed around the ring gear 42. The annular member 56 covers the second end 42B of the ring gear 42. The annular member is disposed at a position that is closer to the connecting part 50 (see FIG. 1) than the second gear 42D with respect to the axial direction of the transmission shaft 26 (see FIG. 1).

Figure 4:
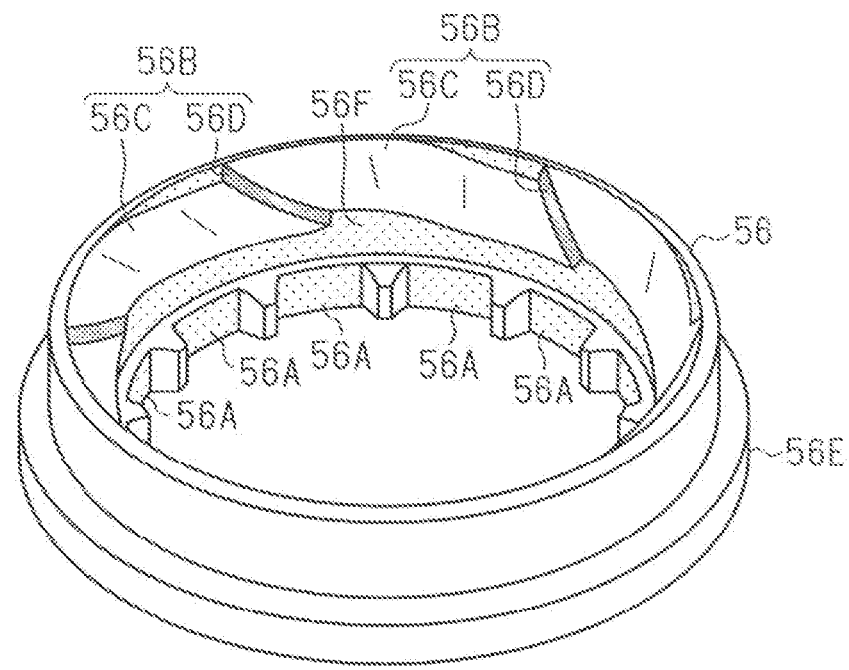
FIG. 4 is a perspective view of the annular member of the switching mechanism illustrated in FIG. 2.

As shown in FIG. 4, the annular member 56 has a plurality of recesses 56A, a plurality of grooves 56B and an annular protrusion 56E. The recesses 56A are formed in an inner peripheral part of the annular member 56. The grooves 56B are formed on the side surface portion (end surface portion in the axial direction). The annular protrusion 56E is formed in the outer peripheral part of the annular member 56. The annular protrusion 56E is formed in a portion of the outer peripheral part of the annular member 56 that is located on a side near the second gear 42D (see FIG. 3) of the ring gear 42.

The recesses 56A extend in the axial direction in a portion of the inner peripheral part of the annular member 56 on the side with the ring gear 42. The outer periphery of the ring gear 42 has a plurality of protrusions 42E (see FIG. 3). The protrusions 42E extend in the axial direction of the transmission shaft 26. The protrusions 42E are fitted into the recesses 56A. The recesses 56A are formed slightly larger than the protrusions 42E. Since the recesses 56A are fitted to the protrusions 42E, the annular member 56 integrally rotates with the ring gear 42 when the ring gear 42 rotates. Furthermore, the recesses 56A of the annular member 56 can move axially along the protrusions 42E (see FIG. 1). For this reason, the annular member 56 can be moved in the axial direction with respect to the ring gear 42.

Figure 5:
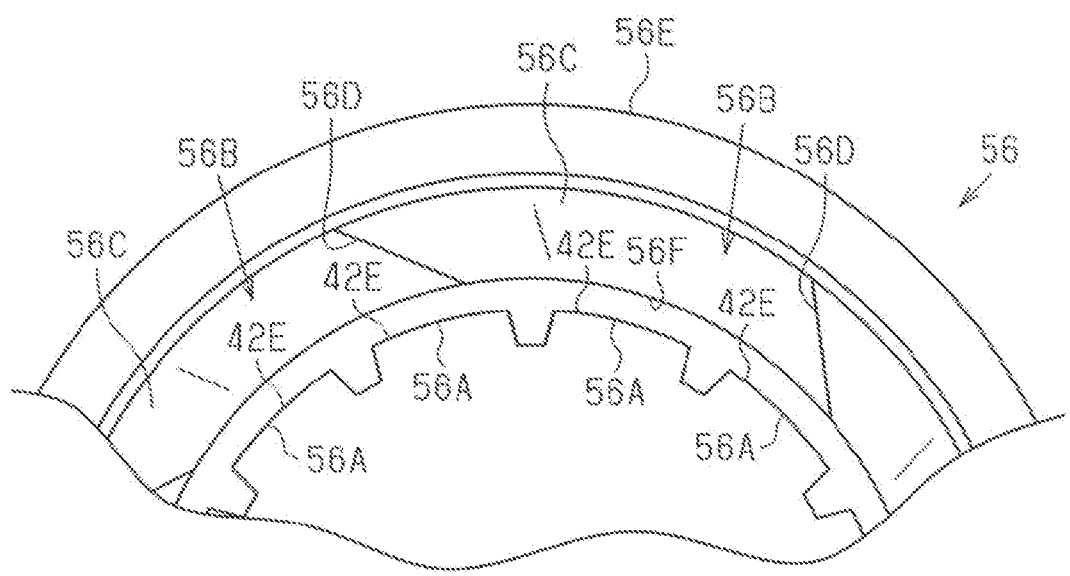
FIG. 5 is a partial elevational view of the ring gear and a part of the annular member illustrated in FIG. 3.

The grooves 56B are formed on the side surface portion of the inner periphery of the annular member 56 on the side facing the connecting part 50, as shown in FIG. 6. The grooves 56B oppose the pawl members 54. As shown in FIG. 5, each of the grooves 56B comprises a first guide surface 56C, which becomes shallower in the axial direction toward one circumferential direction of the annular member 56. Furthermore, each of the grooves 56B comprises a second guide surface 56D, which becomes smaller in the radial direction at the other end in the circumferential direction of the annular member 56. The grooves 568 are formed continuously in the circumferential direction of the annular member 56. An inner periphery surface 56F of the annular member 56 on the side facing the connecting part 50 is continuous with the grooves 56B. The inner periphery surface 56F is formed in an annular shape.

As shown in FIG. 6, the second biasing member 58 is attached between the ring gear 42 and the end of the annular member 56 on the side facing the ring gear 42 with respect to the axial direction of the transmission shaft 26. The second biasing member 58 applies a force on the annular member 56, toward the side with the connecting part 50.

The cam 60 is disposed coaxially around the annular member 56. The cam 60 is rotatably supported by the housing 16, around the axis of the annular member 56. Specifically, the cam 60 is fitted to a cylindrical portion 16D, which extends from the end of the housing 16 on the side with the front sprocket S (see FIG. 1) with respect to the axial direction of the transmission shaft 26. The cam 60 comprises a cam surface 60A and a gear 60E. The cam 60 is formed in an annular shape.

As shown in FIGS. 6 and 7, the cam surface 60A is formed on the side surface portion of the cam 60 on the side with the ring gear 42 with respect to the axial direction of the transmission shaft 26. The cam surface 60A comprises inclined portions 60B, first planar portions 60C and second planar portions 60D. The inclined portions 60B are inclined toward the connecting part 50 side (right side in FIG. 7 toward one circumferential direction. The first planar portions 60C and the second planar portions 60D are continuous with each of the two ends of the inclined portions 60B in the circumferential direction and which are perpendicular to the transmission shaft 26. The first planar portions 60C are disposed in a position of the cam 60 that is closer to the side with the ring gear 42 than the second planar portions 60D with respect to the axial direction of the transmission shaft 26.

As shown in FIG. 6, the coupling body 62 comprises an annular portion 62A and a plurality of operating pieces 62B. The operating piece 62B extends from the annular portion 62A in the radial direction. The annular portion 62A comes in contact with the protrusion 56E of the annular member 56 from the opposite side of the ring gear 42. The operating pieces 62B are provided in the circumferential direction of the annular portion 62A. Here, as shown in FIG. 1, two of the operating pieces 62B are provided in symmetrical positions with respect to the center axis C. As shown in FIG. 6, the operating pieces 62B of the coupling body 62 contact the cam surface 60A in the axial direction of the transmission shaft 26. The operating pieces 62B of the coupling body 62 are fitted to the grooves 16C of the housing 16, which extend in the axial direction of the transmission shaft 26, in the circumferential direction of the cam 60. The coupling body 62 can be moved along the grooves 16C in the axial direction of the transmission shaft 26.

The actuator 64 is disposed radially outward of the cam 60. The actuator 64 is joined to the gear 60E of the cam 60. The actuator 64 rotates the cam 60 by a predetermined angle. A protrusion (not shown) is formed in the inner peripheral part of the cam 60. The protrusion (not shown) is inserted into a hole (not shown) formed in the cylindrical portion 16D of the housing 16. The rotational angle of the cam 60 is restricted by the end surface of the hole (not shown) in the circumferential direction.

The operation of the switching mechanism 20 will be explained with reference to FIGS. 6 to 11.

As shown in FIGS. 6 and 7, when the rotational phase of the cam 60 is in a phase in which the first planar portions 60C of the cam surface 60A and the operating pieces 62B of the coupling body 62 are in contact, the annular member 56 is maintained in a position on the side with the ring gear 42 via the coupling body 62. At this time, the grooves 56B of the annular member 56 are separated from the pawl members 54. For this reason, the pawl members 54 are maintained in protruding positions, which protrude toward the grooves 16C that are formed in the opposing portion 16A of the housing 16. For this reason, the pawl members 54 become unable to rotate relative to the housing 16. The pawl members 54 are supported by the transmission shaft 26 so as to be relatively non-rotatable via the retaining member 44. For this reason, the pawl members 54 restrict the rotation of the transmission shaft 26 and the sun gear 36 (see FIG. 1) in one direction.

Figure 8:
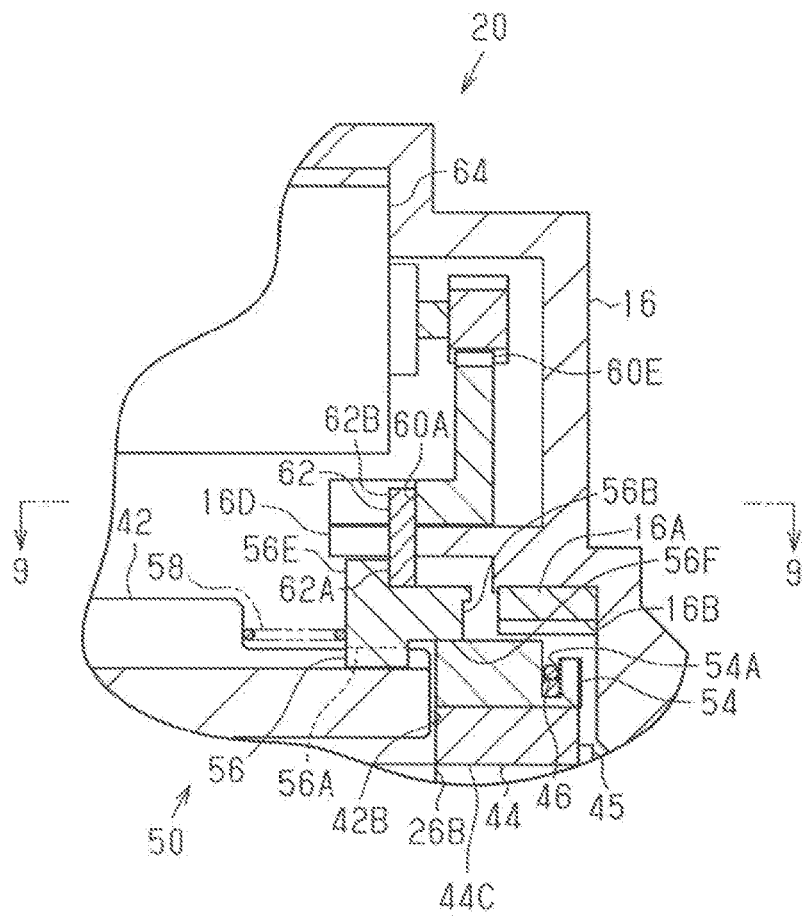
FIG. 8 is an enlarged, partial cross-sectional view of the connecting part of the switching mechanism illustrated in FIG. 1 in a retracted position.
Figure 9:
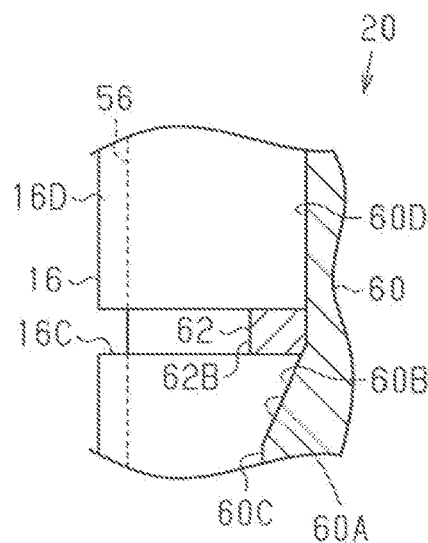
FIG. 9 is a cross-sectional view of the connecting part of the switching mechanism as seen along section line 9-9 of FIG. 8.
Figure 10:
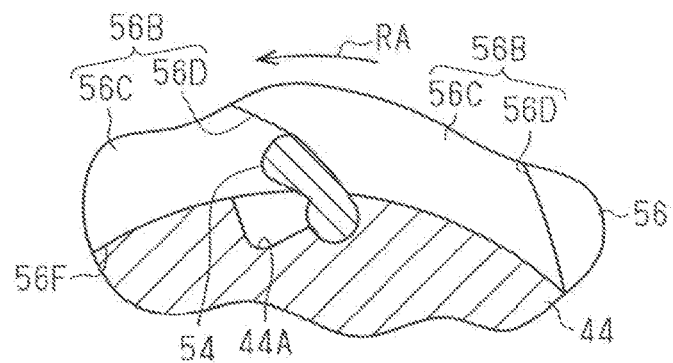
FIG. 10 is a partial cross-sectional view of the connecting part of the switching mechanism showing the operation of the connecting part of the switching mechanism illustrated in FIG. 1.

As shown in FIGS. 8 and 9, when the rotational phase of the cam 60 moves from a phase in which the first planar portion 60C of the cam surface 60A and the operating pieces 62B of the coupling body 62 are in contact toward a phase in which the second planar portions 60D of the cam surface 60A and the operating pieces 62B of the coupling body 62 are in contact, the pawl members 54 in their protruding positions are guided along the first guide surfaces 56C to the second guide surfaces 56D, accompanying the rotation of the annular member 56 in one direction (the arrow RA direction in FIG. 10). Specifically, the pawl members 54 move from the shallow portion to the deep portion of the first guide surfaces 56C. At this time, as shown in FIG. 9, the annular member 56 is maintained in a position on the connecting part 50 side via the coupling body 62.

Figure 11:
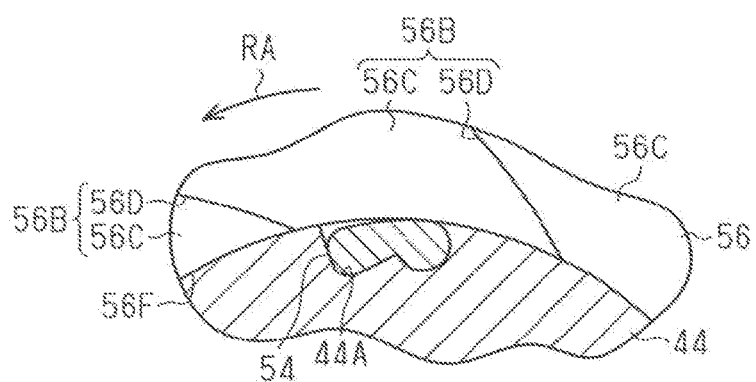
FIG. 11 is a partial cross-sectional view of the connecting part of the switching mechanism showing the operation of the connecting part of the switching mechanism illustrated in FIG. 1.

Then, with the rear surfaces of the pawl members 54 contacting the second guide surfaces 56D and the annular member 56 being further rotated, the pawl members 54 are pressed toward the grooves 44A along the second guide surfaces 56D. That is, the annular member 56 of the control unit 52 presses the pawl members 54 of the connecting part 50 and moves this from the protruding positions to the retracted positions. The pawl members 54 will be in a state of being pressed by the inner peripheral surface 56F of the annular member 56 of the connecting part 50; therefore, the pawl members 54 are maintained in the retracted positions housed in the grooves 44A of the retaining member 44, as shown in FIG. 11. For this reason, the pawl members 54 are able to rotate relative to the housing 16. The pawl members 54 are supported b r the transmission shaft 26 so as to be relatively non-rotatable via the retaining member 44. For this reason, the pawl members 54 do not restrict the rotation in one direction of the transmission shaft 26 and the sun gear 36, which is relatively non-rotatable with respect to the transmission shaft 26.

The one-way clutch 48 shown in FIG. 1 is a roller clutch. The one-way clutch 48 is provided between the carrier 40 and the ring gear 42. The one-way clutch 48 integrally rotates the carrier 40 and the ring gear 42 when the rotational speed of the carrier 40 in one direction is equal to or greater than the rotational speed of the ring gear 42. The one-way clutch 48 permits the relative rotation between the carrier 40 and the ring gear 42 when the rotational speed of the carrier 40 in one direction is less than the rotational speed of the ring gear 42 in one direction. Meanwhile, the rotation of the carrier 40 and the ring gear 42 in one direction corresponds to the rotational direction of the input rotational shaft 12 when the bicycle (not shown) moves forward.

The gear changing state of the bicycle drive unit 10 will be described.

When the pawl members 54 are in the protruding positions, the sun gear 36 is restricted from rotating relative to the housing 16. For this reason, when the rotation is input to the carrier 40, the planetary gear 38 revolves around the sun gear 36 while being rotated in the same direction as the revolving direction by the reaction force that is generated by the sun gear 36. With the rotation of the planetary gear 38, the ring gear 42 is pressed in the rotational direction of the planetary gear 38, and the ring gear 42 is rotated in the same direction as the carrier 40. At this time, the rotation that is inputted to the carrier 40 is accelerated and outputted from the ring gear 42.

When the pawl members 54 are in the retracted positions, the sun gear 36 is not restricted from rotating relative to the housing 16. For this reason, when a rotation is inputted to the carrier 40, the planetary gears 38 will rotate the sun gear 36 and cannot transmit the rotation to the ring gear 42. As a result, the rotational speed of the carrier 40 in one direction will become equal to or greater than the rotational speed of the ring gear 42. For this reason, a relative rotation between the carrier 40 and the ring gear 42 is restricted, and the carrier 40 and the ring gear 42 are integrally rotated via the one-way clutch 48. Furthermore, at this time, since the sun gear 36 is pressed by the planetary gears 38 in the same direction as the carrier 40 and the ring gear 42, the sun gear 36 also integrally rotates with the carrier 40 and the ring gear 42. In other words, the one-way clutch 48 controls the rotation of the sun gear 36.

The assist mechanism 22 comprises an assist motor 66 and a decelerating mechanism 68.

The assist motor 66 is disposed outside of the input rotational shaft 12 in the radial direction. The assist motor 66 is connected to the power transmission path, from the input rotational shaft 12 to the output part 14. The output shaft 66A of the assist motor 66 is disposed parallel to the input rotational shaft 12.

The decelerating mechanism 68 comprises a first reduction gear 70, a second reduction gear 72, a one-way clutch 74 and a third reduction gear 76.

The first reduction gear 70 has a cylindrical shape. Since the first reduction gear 70 is connected to the output shaft 66A of the assist motor 66, the rotation of the assist motor 66 is inputted to the first reduction gear 70.

The second reduction gear 72 is disposed coaxially with the first reduction gear 70. The second reduction gear 72 is connected to the first reduction gear 70 via the one-way clutch 74. The second reduction gear 72 comprises a support portion 72A for supporting the first reduction gear 70 and the one-way clutch 74 on the outer peripheral part of the support portion 72A. The two opposite axial ends of the second reduction gear 72 are rotatably supported by the housing 16 via a bearing or the like.

The one-way clutch 74 transmits the rotation in one direction from the first reduction gear 70 to the second reduction gear 72, and does not transmit the rotation in the other direaion from the second reduction gear 72 to the first reduction gear 70.

The second reduction gear 72 is connected to the third reduction gear 76. The rotation of the second reduction gear 72 in one direction is transmitted to the third reduction gear 76. The two opposite axial ends of the third reduction gear 76 are rotatably supported by the housing 16 via a bearing or the like.

The third reduction gear 76 is connected to the first gear 42C of the ring gear 42. For this reason, the torque of the assist motor 66 is decelerated by the decelerating mechanism 68 and is inputted to the ring gear 42.

The control unit 24 drives the assist motor 66 according to the manual drive force that is applied to the input rotational shaft 12. The control unit 24 is provided inside of the housing 16. The control unit 24 comprises a circuit board. The main surface of the circuit board is disposed to be perpendicular to the input rotational shaft 12. The manual drive force is detected by, for example, a torque sensor 78, which is attached to the input rotational shaft 12 or the transmission mechanism 18.

Figure 12:
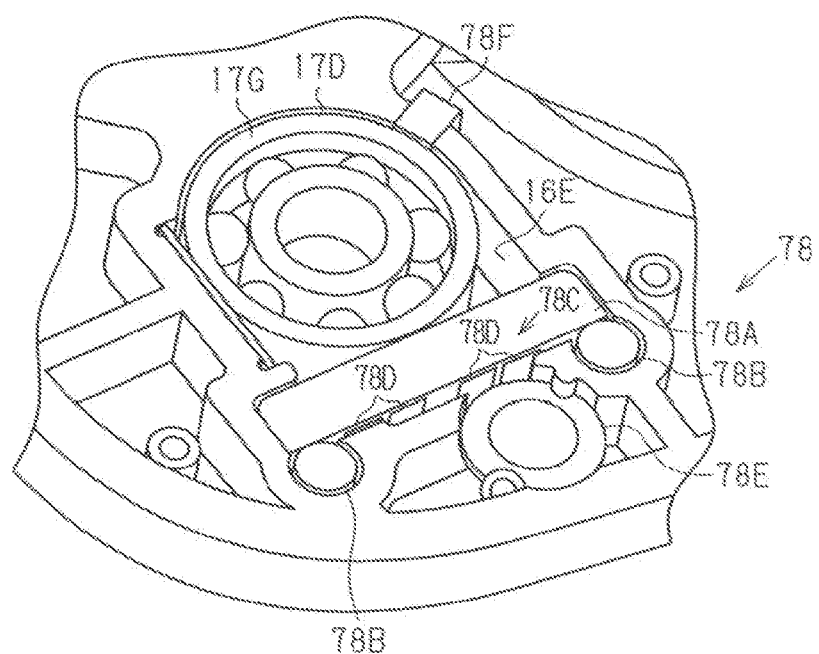
FIG. 12 is a partial perspective view of a torque sensor of the bicycle drive unit illustrated in FIG. 1.

As shown in FIG. 1, the torque sensor 78 is provided in a vicinity of the bearing 17D, which supports one end of the transmission shaft 26. The torque sensor 78 is provided to the input side end of the transmission shaft 26. As shown in FIG. 12, the torque sensor 78 is configured comprising a load cell 78A, a pair of support members 78B, a strain sensor 78C and a pressing member 78F.

The load cell 78A has a cuboid form. The load cell 78A is disposed so that the longitudinal direction of the load cell 78A is parallel to a tangential direction of an outer ring 17G. One side surface of the load cell 78A contacts the outer periphery of the outer ring 17G of the bearing 17D. The support members 78B support the load cell 78A from the opposite side of the side on which the load cell 78A contacts the bearing 17D. The support members 78B are provided to both ends of the load cell 78A in the longitudinal direction.

Each of the support members 78B has a columnar shape The support members 78B are disposed so that the axes of the support members 78B are perpendicular to the longitudinal direction of the load cell 78A. The support members 78B are also disposed so that the outer periphery thereof contacts the load cell 78A. The load cell 78A and the support members 78B are provided to the recess 16E of the housing 16. The support members 78B are provided fixed to the recess 16E, while the load cell 78A is provided to be slightly movable in the recess 16E. The contact position between the outer periphery of the outer ring 17G of the bearing 17D and the load cell 78A is substantially equal to the center between the support members 78B in the longitudinal direction of the load cell 78A. The load cell 78A is supported by the recess 16E so that the load cell 78A can be slightly deflected between the support members 78B. The load cell 78A is provided to the housing 16 so that the position in which the load cell 78A and the outer ring 17G of the bearing 17D come in contact will be in the direction of the reaction force of the second transmission gear 34 or will be slightly offset from this reaction force direction.

The bearing 17D is provided inserted into the recess 16E. The recess 16E is formed slightly larger than the bearing 117D, and the bearing 117D is configured to be slightly movable in a direction perpendicular to the center axis C (see FIG. 1) in the recess 16E. The bearing 17D presses the load cell 78A via the pressing member 78F. The pressing member 78F is formed from, for example, a plate spring The strain sensor 78C is provided to the side surface of the load cell 78A on the opposite side of the side surface that contacts the bearing 17D, that is, on the side surface that the support member 78B contacts.

The strain sensor 78C is realized by a strain gauge, a semiconductor sensor, or the like. The load cell 78A is further provided with a plurality of strain gauges 78D. Here, two of the strain gauge 78D have a detection characteristic in a direction parallel to the longitudinal direction of the load cell 78A is disposed near the center of the load cell 78A in the longitudinal direction, and two of the strain gauge 78D have a detection characteristic in a direction perpendicular to the longitudinal direction of the load cell 78A. For example, four strain gauges 78D are provided symmetrically with respect to the center of the load cell 78A in the longitudinal direction. Two strain gauges 78D are provided near the center of the load cell 78A in the longitudinal direction on one end side. The other two strain gauges 78D are provided near the center of the load cell 78A in the longitudinal direction on the other end side. The detection directions of the four strain gauges 78D are a direction that is parallel to and a direction that is perpendicular to the longitudinal direction of the load cell 78A. A bridge circuit is formed from the four strain gauges 78D to detect the strain generated in the load cell 78A.

An amplifying device 78E is provided in the vicinity of the load cell 78A. The amplifying device 78E amplifies a signal output from a strain sensor 78C. The amplifying device 78E is provided in the recess 16E. The amplifying device 78E outputs an amplified signal to the control unit 24 (see FIG. 1).

Figure 13:
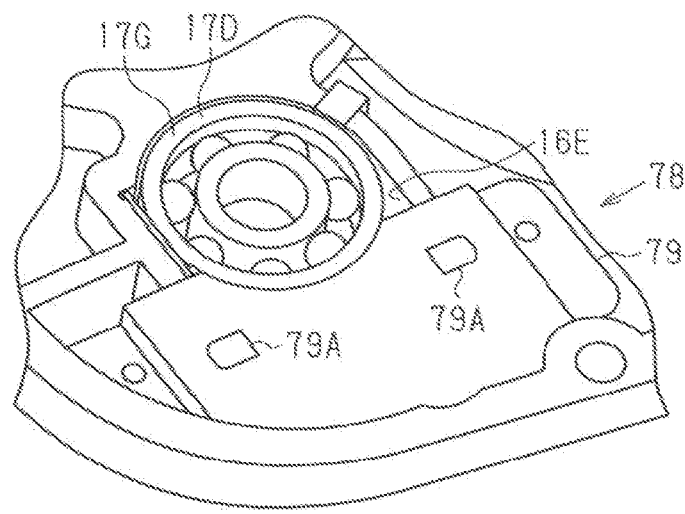
FIG. 13 is a partial perspective view of the torque sensor a state in which a shield plate is attached to the torque sensor of the bicycle drive unit illustrated in FIG. 1.

As shown in FIG. 13, a shield plate 79 covers the opening of the recess 16E to which the load cell 78A, the support member 78B, and the amplifying device 78E are provided. The shield plate 79 is formed from metal. A spring member 79A is formed on the shield plate 79. The spring member 79A prevents the load cell 78A from moving to the opening side of the recess 16E.

When the torque sensor 78 detects torque that is equal to or greater than a predetermined torque, the control unit 24 shown in FIG. 1 drives the assist motor 66 according to the torque that is detected by the torque sensor 78. The control unit 24 controls the actuator 64. The control unit 24 is connected to a shift operating unit, which is not shown, and drives the actuator 64 based on the signal from the shift operating unit. The shift operating unit is realized by a shift switch and a shift lever, which are provided to the handle of the bicycle. The shift operating unit can be connected to the control unit 24 via electrical wiring or may be wirelessly connected to the control unit 24. The control unit 24 can drive the actuator 64 based on, for example, a detection signal from a sensor that is provided to the bicycle. Examples of the sensor include a speed sensor for detecting the speed of the bicycle and a cadence sensor for detecting the cadence of the crank. With the control unit 24 driving the actuator 64, the bicycle drive unit 10 functions as a two-step transmission device.

The power transmission path of the bicycle drive unit 10 will be described. The assist motor 66 is coupled to the ring gear 42. At least a part of the switching mechanism 20 is coupled to the transmission path between the assist motor 66 and the output part 14. For this reason, in the case that the assist motor 66 is being driven, the torque of the assist motor 66 is added to the torque that is transmitted to the annular member 56. Accordingly, the control unit 52 moves the pawl members 54 of the connecting part 50 from the protruding position to the retracted position, using the manual drive force and the rotational force of the assist motor 66. That is, the switching mechanism 20 can switch the gear changing state of the transmission mechanism 18, using the rotational force of the assist motor 66. Furthermore, when the assist motor 66 is not being driven, the control unit 52 can move the pawl members 54 of the connecting part 50 from the protruding position to the retracted position by using only the manual drive force.

The bicycle drive unit 10 exerts the following effects.

(1) The switching mechanism 20 can switch the gear changing state of the transmission mechanism 18, using the rotational force of the assist motor 66. Accordingly, the shifting performance can be improved, as compared to when the assist motor 66 is coupled downstream of the transmission mechanism 18.

(2) The switching mechanism 20 comprises the one-way clutch 48. Accordingly, for example, the configuration of the bicycle drive unit 10 can be simplified, as compared to when controlling the rotation of the sun gear 36 with a motor.

SECOND EMBODIMENT

A bicycle drive unit in accordance with a second embodiment will be described with reference to FIGS. 14 and 15. The configurations of the second embodiment that are common to those in the first embodiment have been given the same reference symbol, and the common descriptions thereof have been omitted.

Figure 14:
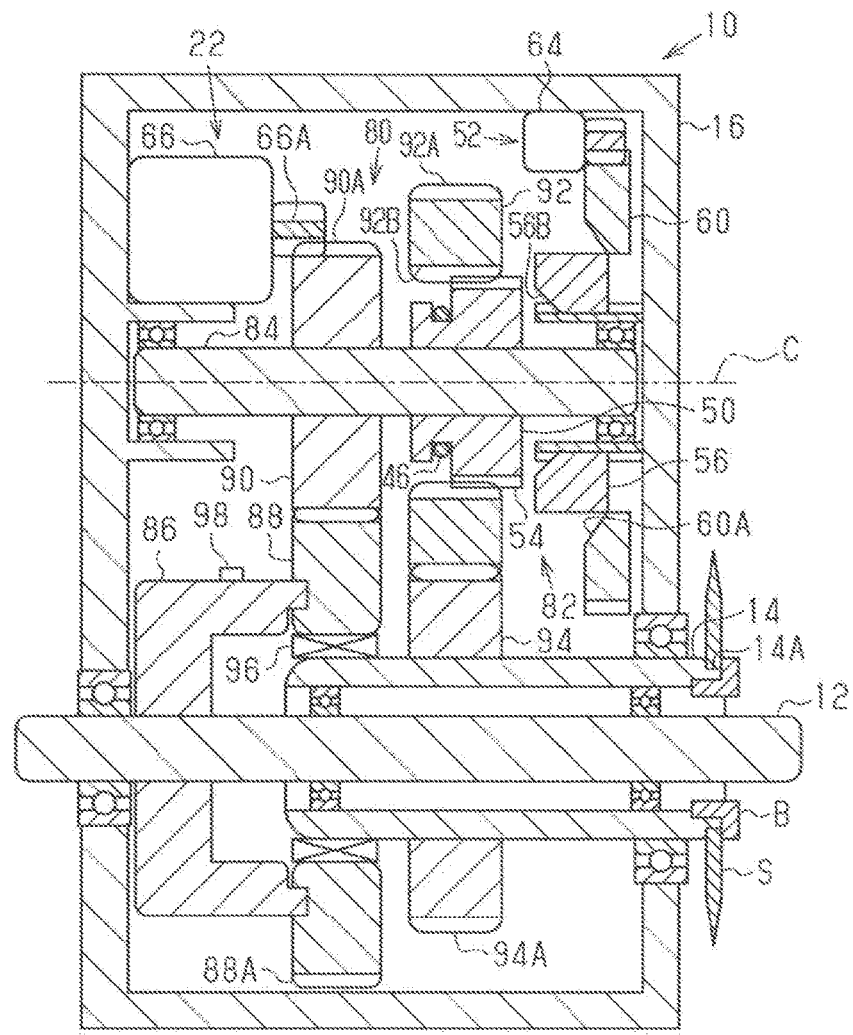
FIG. 14 is a schematic cross-sectional view of a bicycle drive unit in accordance with a second embodiment.

As shown in FIG. 14, the bicycle drive unit 10 comprises the input rotational shaft 12, the output part 14, the housing 16, the assist mechanism 22, a transmission mechanism 80 and a switching mechanism 82.

The transmission mechanism 80 comprises a transmission shaft 84, a transmission body 86, a first rotating body 88, a second rotating body 90, a third rotating body 92 and a fourth rotating body 94.

The transmission shaft 84 is disposed outside of the input rotational shaft 12 in the radial direction. The transmission shaft 84 is provided parallel to the input rotational shaft 12. The transmission shaft 84 is rotatably supported by the housing 16. The transmission shaft 84 is rotatable about a center axis C whose position does not change with respect to the input rotational shaft 12.

The transmission body 86 is formed in a tubular shape. The transmission body 86 is disposed coaxially around the input rotational shaft 12. The transmission body 86 is supported by the input rotational shaft 12 via a spline fit connection, a press fit connection, or the like so as to be relatively non-rotatable. For this reason, the transmission body 86 is integrally rotatable with the input rotational shaft 12.

The first rotating body 88 comprises a cylindrical shape, and one end in the axial direction thereof is fitted to the transmission body 86. That is, the transmission body 86 joins the input rotational shaft 12 and the first rotating body 88. A gear 88A is formed on the outer periphery of the first rotating body 88.

The second rotating body 90 is disposed coaxially around the transmission shaft 84. The second rotating body 90 is supported by the transmission shaft 84 via a spline fit connection, a press fit connection, or the like so as to be relatively non-rotatable. For this reason, the second rotating body 90 can be integrally rotated with the transmission shaft 84 around the center axis C. A gear 90A is formed on the outer periphery of the second rotating body 90. The gear 90A meshes with the gear 88A of the first rotating body 88. For this reason, the torque of the first rotating body 88 is transmitted to the second rotating body 90 via the transmission body 86. The number of teeth of the gear 90A of the second rotating body 90 is less than the number of teeth of the gear 88A of the first rotating body 88. For this reason, the rotation of the first rotating body 88 is accelerated and transmitted to the second rotating body 90.

The third rotating body 92 has a cylindrical shape. The third rotating body 92 is disposed around the transmission shaft 84. The third rotating body 92 is supported by the transmission shaft 84 via the switching mechanism 82. The third rotating body 92 may be rotatably supported by the transmission shaft 84. The third rotating body 92 is integrally rotatable with the second rotating body 90 and the transmission shaft 84 around the center axis C, when joined to the transmission shaft 84 via the switching mechanism 82. The inner periphery of the third rotating body 92 has a plurality of groove 92B. The grooves 92B are joined with the switching mechanism 82. A gear 92A is formed on the outer periphery of the third rotating body 92.

The fourth rotating body 94 has a cylindrical shape. The fourth rotating body 94 is disposed around the output part 14 coaxially with the output part 14. The fourth rotating body 94 is joined to the output part 14 via a spline fit connection, a press fit connection, or the like. For this reason, the fourth rotating body 94 can be integrally rotated with the output part 14. A gear 94A is formed on the outer periphery of the fourth rotating body 94. The gear 94A meshes with the gear 92A of the third rotating body 92. For this reason, the torque of the third rotating body 92 is transmitted to the fourth rotating body 94. The number of teeth of the gear 94A of the fourth rotating body 94 is less than the number of teeth of the gear 92A of the third rotating body 92. For this reason, the rotation of the third rotating body 92 is decelerated at a predetermined speed reduction ratio and transmitted to the fourth rotating body 94. The speed increase ratio between the first rotating body 88 and the second rotating body 90 is greater than the predetermined speed reduction ratio between the third rotating body 92 and the fourth rotating body 94. For this reason, when the rotation is transmitted from the first rotating body 88 to the fourth rotating body 94 via the second rotating body 90 and the third rotating body 92, the rotational speed of the fourth rotating body 94 is greater than that of the first rotating body 88.

The switching mechanism 82 switches between a first state and a second state. The first state is a state in which the output part 14 and the input rotational shaft 12 are coupled via the transmission mechanism 80. The second state is a state in which the output part 14 and the input rotational shaft 12 are coupled without interposing the transmission mechanism 80.

In the first state, the switching mechanism 82 permits torque to be transmitted between the input rotational shaft 12 and the first rotating body 88, between the first rotating body 88 and the second rotating body 90, between the second rotating body 90 and the third rotating body 92, between the third rotating body 92 and fourth rotating body 94, and between the fourth rotating body 94 and the output part 14. In the second state, the switching mechanism 82 does not permit torque to be transmitted between the second rotating body 90 and the third rotating body 92.

The switching mechanism 82 comprises the control unit 52, the cam 60, the actuator 64 and a one-way clutch 96. The control unit 52 is disposed between the transmission shaft 84 and the inner periphery of the third rotating body 92. The cam 60 is provided for operating the control unit 52. The actuator 64 is provided for operating the cam 60. The one-way clutch 96 is disposed between the inner periphery of the transmission mechanism 28 and the outer periphery of the output part 14.

The control unit 52 comprises a connecting part 50, at least a part of which is disposed between the outer periphery of the transmission shaft 84 and the inner periphery of the third rotating body 92, and an annular member 56.

The connecting part 50 is provided on the outer periphery of the transmission shaft 84. The connecting part 50 can couple the transmission shaft 84 and the third rotating body 92. The connecting part 50 comprises the pawl members 54 that protrude from the transmission shaft 84 toward the inner periphery of the third rotating body 92.

The annular member 56 has a cylindrical shape. The annular member 56 is provided coaxially around the transmission shaft 84. The annular member 56 can be moved in the axial direction of the transmission shaft 84.

The one-way clutch 96 is a roller clutch. The one-way clutch 96 integrally rotates the input rotational shaft 12 and the output part 14 when the rotational speed of the input rotational shaft 12 in one direction is greater than or equal to the rotational speed of the output part 14 in one direction. The one-way clutch 96 permits a relative rotation between the input rotational shaft 12 and the output part 14 when the rotational speed of the input rotational shaft 12 in one direction is less than the rotational speed of the output part 14 in one direction. The rotation in one direction corresponds to the rotational direction of the input rotational shaft 12 when the bicycle (not shown) moves forward.

When the annular member 56 moves to the side away from the connecting part 50 in the axial direction of the transmission shaft 84 in a position away from the connecting part 50, the grooves 5613 separate from the pawl members 54, and the pawl members 54 move to the protruding positions that protrude toward the grooves 92B of the third rotating body 92. In other words, when the transmission mechanism 80 is in the first state, the grooves 56B separate from the pawl members 54, and the pawl members 54 move to the protruding positions that protrude toward the grooves 92B of the third rotating body 92. As a result, the pawl members 54 are fitted in the grooves 92B. For this reason, the third rotating body 92 becomes relatively non-rotatable with respect to the transmission shaft 84 and the second rotating body 90. For this reason, the torque of the transmission shaft 84 and the second rotating body 90 is transmitted to the third rotating body 92.

The number of teeth of the gear 88A of the first rotating body 88 is less than the number of teeth of the gear 94A of the fourth rotating body 94. For this reason, when the switching mechanism 82 is in the first state shown in FIG. 14, the rotation that is inputted to the transmission mechanism 80 is accelerated and is outputted to the output part 14. When the switching mechanism 82 is in the first state, the rotational speed of the input rotational shaft 12 and the first rotating body 88 is less than the rotational speed of the output part 14. For this reason, the one-way clutch 96 permits the relative rotation between the input rotational shaft 12 and the first rotating body 88, and the output part 14. As a result, the rotation of the input rotational shaft 12 is accelerated by the transmission mechanism 80 and is outputted to the output part 14.

Figure 15:
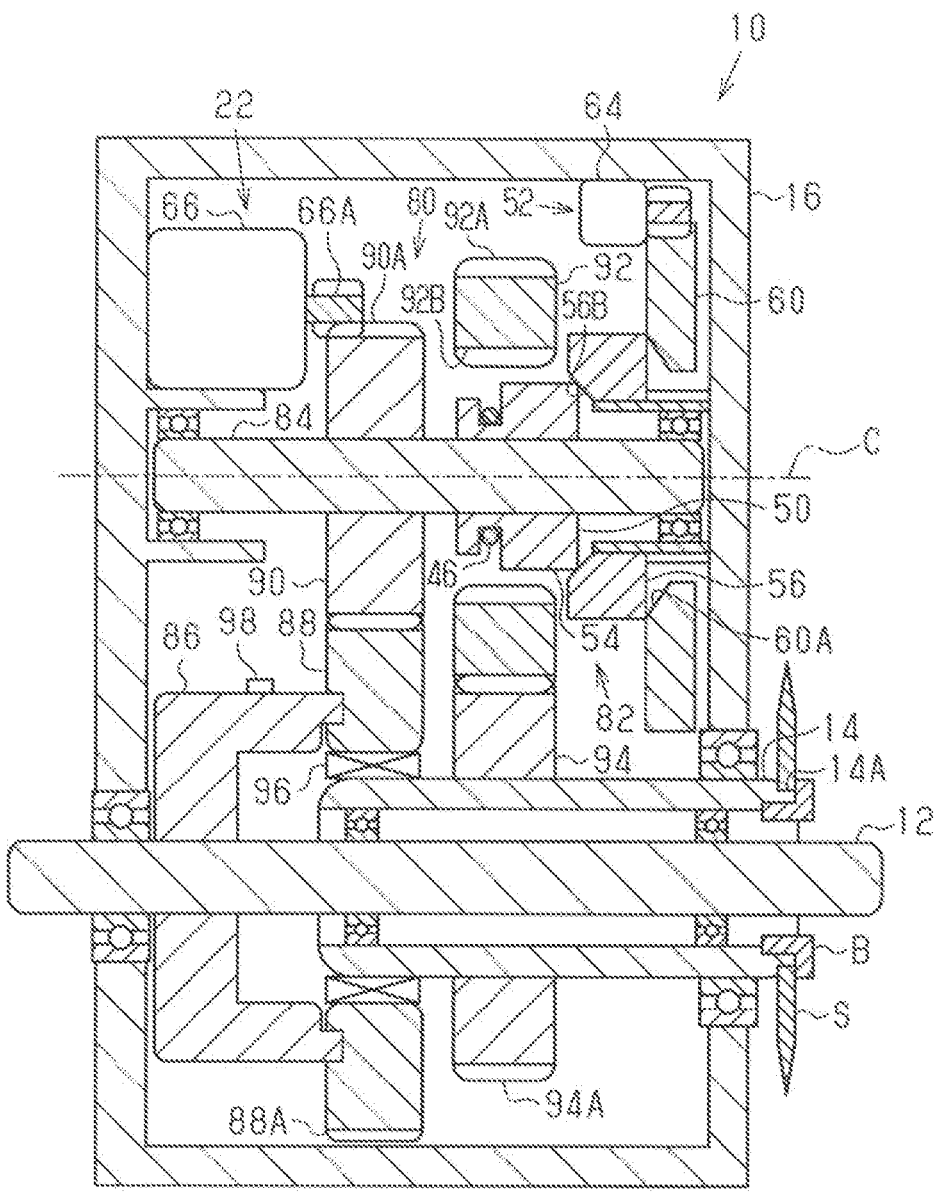
FIG. 15 is a schematic cross-sectional view of a connecting part of a switching mechanism of the bicycle drive unit illustrated in FIG. 14 in a retracted position.

As shown in FIG. 15, when the annular member 56 moves to the side approaching the connecting part 50 in the axial direction of the transmission shaft 84 and is in a position that is in contact with the connecting part 50, that is, when the transmission mechanism 80 is in the second state, the grooves 56B pushes the pawl members 54 down. The pawl member 54 is thereby moved to a retracted position, which is withdrawn from the groove 92B of the third rotating body 92. That is, the annular member 56 detaches the connecting part 50 from the third rotating body 92. For this reason, the third rotating body 92 becomes relatively rotatable with respect to the transmission shaft 84 and the second rotating body 90. For this reason, the torque of the transmission shaft 84 and the second rotating body 90 is not transmitted to the third rotating body 92.

When the switching mechanism 82 is in the second state shown in FIG. 15, torque is not transmitted from the second rotating body 90 to the third rotating body 92. For this reason, when the switching mechanism 82 is in the second state, the rotational speed of the input rotational shaft 12 and the first rotating body 88 is greater than or equal to the rotational speed of the output part 14. For this reason, the one-way clutch 96 integrally rotates the input rotational shaft 12 and the first rotating body 88, and the output part 14. As a result, the rotation of the input rotational shaft 12 is output to the output part 14 without being accelerated by the transmission mechanism 80.

The assist mechanism 22 comprises an assist motor 66. The gear of the output shaft 66A of the assist motor 66 meshes with the gear 90A of the second rotating body 90. The rotation of the assist motor 66 is transmitted to the second rotating body 90.

A torque sensor 98 is attached to the transmission body 86. The torque sensor 98 outputs a signal corresponding to the amount of torque that is applied to the transmission body 86 to the control unit 24. The control unit 24 controls the assist motor 66 based on the output of the torque sensor 98. The torque sensor 98 is realized by, for example, a strain sensor. The signal of the strain sensor is transmitted to the control unit 24 via a wired connection or wirelessly.

The bicycle drive unit 10 exerts the following effects.

(1) The switching mechanism 82 can switch the gear changing state of the transmission mechanism 80, using the rotational force of the assist motor 66. Accordingly, the shifting performance can be improved, as compared to when the assist motor 66 is coupled downstream from the transmission mechanism 80.

(2) The connecting part 50 is disposed between the third rotating body 92 and the transmission shaft 84 after the rotation of the input rotational shaft 12 has been accelerated. That is, the amount of torque that is applied to the connecting part 50 is less than the amount of torque that is applied to the input rotational shaft 12. For this reason, when the transmission mechanism 80 is in the first state and the pawl member 54 of the connecting part 50 is fitted in the grooves 92B of the third rotating body 92, the amount of force required for the pawl member 54 to be pulled out of the groove 92B can be reduced. The switching mechanism 20 switches the transmission of the torque between the third rotating body 92 and the transmission shaft 84, which has a higher rotational speed and less torque than the input rotational shaft 12. For this reason, the transmission performance can be improved, as compared to when switching the transmission of the torque between members after the rotation of the input rotational shaft 12 has been decelerated.

(3) The switching mechanism 20 comprises the one-way clutch 96. For this reason, for example, the configuration of the bicycle drive unit 10 can be simplified, as compared to when, for example, providing an electric clutch and controlling the transmission of the torque between the output part 14 and the input rotational shaft 12 or the first rotating body 88.

(4) The assist motor 66 transmits torque to the fourth rotating body 94. For this reason, the amount of torque that is applied to the connecting part 50 can be reduced, as compared to when transmitting the torque of the assist motor 66 upstream from the fourth rotating body 94, on the power transmission path from the input rotational shaft 12 to the output part 14. As a result, the transmission performance being reduced by the torque from the assist motor 66 can be suppressed.

MODIFIED EXAMPLE

The specific form that the bicycle drive unit can take is not limited to the forms illustrated in the above-described embodiments. The bicycle drive unit can take various forms different from the above-described embodiments. The modified examples of the above-described embodiments discussed below are examples of the various forms that the bicycle drive unit can take.

The assist motor 66 of the first embodiment can be connected to the carrier 40 or the input rotational shaft 12 via the decelerating mechanism 68. In short, the torque of the motor 66 may be transmitted to any rotating body, as long as the rotating body is upstream from the ring gear 42 to which the annular member 56 of the switching mechanism 20 is coupled, on the power transmission path from the input rotational shaft 12 to the output part 14.

The connecting part 50 of the first embodiment can be provided to the opposing portion 16A. in this case, the grooves 56B are formed on the outer periphery of the annular member 56. Furthermore, the switching mechanism 20 moves the pawl members 54 between the protruding positions, which protrude into grooves that are formed on the outer periphery of the transmission shaft 26, and the retracted positions, which is withdrawn from the grooves that are formed on the outer periphery of the transmission shaft 26.

The planetary gear mechanism 30 of the first embodiment can be modified as explained in (A)-(E) below.

(A) The rotation of the input rotational shaft 12 is input to the ring gear, which is an input body. The rotation of the carrier, which is an output body, is output to the output part 14. The rotation of the sun gear, which is a rotating body to be controlled and is also a transmission body, is controlled by the switching mechanism.

(B) The rotation of the input rotational shaft 12 is input to the carrier, which is an input body. The rotation of the sun gear, which is an output body, is output to the output part 14. The rotation of the ring gear, which is a rotating body to be controlled and is also a transmission body, is controlled by the switching mechanism.

(C) The rotation of the input rotational shaft 12 is input to the sun gear, which is an input body. The rotation of the carrier, which is an output body, is output to the output part 14. The rotation of the ring gear, which is a rotating body to be controlled and is also a transmission body, is controlled by the switching mechanism.

(D) The rotation of the input rotational shaft 12 is input to the sun gear, which is an input body. The rotation of the ring gear, which is an output body, is output to the output part 14. The rotation of the carrier, which is a rotating body to be controlled and is also a transmission body, is controlled by the switching mechanism.

(E) The rotation of the input rotational shaft 12 is input to the carrier, which is an input body. The rotation of the sun gear, which is an output body, is output to the output part 14. The rotation of the carrier, which is a rotating body to be controlled and is also a transmission body, is controlled by the switching mechanism.

The assist motor 66 of the second embodiment can be connected to the first rotating body 88, the input rotational shaft 12, the transmission shaft 84, or the transmission shaft 84 via the decelerating mechanism 68. in short, the torque of the motor 66 can be transmitted to the transmission shaft 84 to which the annular member 56 of the switching mechanism 20 is coupled or to any rotating body that is upstream from the transmission shaft 84, on the power transmission path from the input rotational shaft 12 to the output part 14.

The connecting part 50 of the second embodiment can be provided on the inner periphery of the third rotating body 92. In this case, the grooves 56B of the annular member 56 are formed in a shape that can hold the connecting part 50 down, radially outward. Furthermore, the switching mechanism 82 moves the pawl members 54 between the protruding positions, which protrude into grooves that are formed on the outer periphery of the transmission shaft 84, and the retracted positions, which are withdrawn from the grooves that are formed on the outer periphery of the transmission shaft 26.

The transmission mechanism 80 of the second embodiment can be changed to a transmission mechanism that decelerates and outputs the rotation that has been inputted to the input rotational shaft 12. In this case, the same switching mechanism as the switching mechanism 82 is provided between the first rotating body 88 and the output part 14, instead of the one-way clutch 96, to control the power transmission path.

The one-way clutches 48 and 96 of the first and the second embodiments can be a one-way clutch that is provided with a ratchet mechanism.

A one-way clutch that prevents the reverse rotation of the output part 14 can be provided to the bicycle drive unit 10 of the first and the second embodiments. The one-way clutch is, for example, provided between the input rotational shaft 12 and the transmission body (sun gear 36).

The decelerating mechanism 68 of the first and the second embodiments can also be omitted.

The bicycle drive unit 10 of the first and the second embodiments can be provided radially outside of the crankshaft. In this case, a transmission mechanism for inputting the rotation of the crankshaft to the input rotational shaft is provided.

The actuator 64 of the first and the second embodiments can be omitted. In this case, the operating device that is attached to the bicycle and the switching mechanisms 20 and 82 is connected by a wire, and the cam 60 is operated by the operation of the wire.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
   an input rotational shaft;
   an output part;
   a transmission mechanism comprising at least two shift stages and configured to change a speed of a rotational input that is input from the input rotational shaft and output the rotational input to the output part;
   an assist motor that is coupled to a power transmission path from the input rotational shaft to the output part and that is driven according to a manual drive force; and
   a switching mechanism, which can switch a gear changing state of the transmission mechanism by using a rotational force of the assist motor.

2. The bicycle drive unit as recited in claim 1, wherein at least a part of the switching mechanism is coupled to the transmission path between the assist motor and the output part.

3. The bicycle drive unit as recited in claim 1, wherein the transmission mechanism comprises a planetary gear mechanism.

4. The bicycle drive unit as recited in claim 3, wherein
   the planetary gear mechanism comprises an input body, an output body and a transmission body, the input body is rotatably supported by a support member and receives the rotational input of the input rotational shaft, the output body is rotatably supported by the support member and outputs the rotational input outside of the planetary gear mechanism; and
   the switching mechanism further comprises a one-way clutch, which is provided between the input body and the output body and which controls a rotation of the transmission body.

5. The bicycle drive unit as recited in claim 4, wherein the one-way clutch integrally rotates the input body and the output body while a rotational speed of the input body in one direction is equal to or greater than a rotational speed of the output body in the one direction, and permits a relative rotation between the input body and the output body when the rotational speed of the input body in the one direction is less than the rotational speed of the output body in the one direction.

6. The bicycle drive unit as recited in claim 4, wherein the support member can be integrally rotated with the transmission body, and
the switching mechanism comprises a connecting part and a control unit, the connecting part is provided to one of the support member and an opposing portion that opposes the support member, the connecting part is movably disposed between a protruding position in which rotation of the transmission body is regulated in at least one direction and a retracted position in which the rotation of the transmission body is not regulated, and the control unit is configured to move the connecting part from the protruding position to the retracted position by using the rotational force of the assist motor.

7. The bicycle drive unit as recited in claim 6, wherein the control unit is configured to press the connecting part and move the connecting part from the protruding position to the retracted position.

8. The bicycle drive unit as recited in claim 6, further comprising
additional connecting parts provided around a rotational axis of the support member.

9. The bicycle drive unit as recited in claim 6, wherein the control unit comprises an annular member, which integrally rotates with the output body, the annular member has a groove in a portion that opposes the connecting part, the groove becomes shallower in a radial direction toward one circumferential direction.

10. The bicycle drive unit as recited in claim 9, wherein the annular member presses the connecting part radially inward.

11. The bicycle drive unit as recited in claim 9, wherein the control unit further comprises a cam that is arranged to move the annular member in a rotational axis direction and an electric motor that is arranged to drive the cam.

12. The bicycle drive unit as recited in claim 6, wherein the transmission body comprises a sun gear, which integrally rotates with the support member,
the output body comprises a ring gear, which is disposed coaxially around the sun gear, and
the input body comprises a carrier, which is disposed between the sun gear and the ring gear and which integrally rotates a plurality of planetary gears.

13. The bicycle drive unit as recited in claim 12, wherein the connecting part is disposed on the support member.

14. The bicycle drive unit as recited in claim 6, wherein the connecting part comprises a pawl member.

15. The bicycle drive unit as recited in claim 4, wherein the assist motor is connected to one of the output body and an upstream side of the output body in the power transmission path.

16. The bicycle drive unit as recited in claim 1, wherein the transmission mechanism comprises a plurality of rotating bodies with one of the rotating bodies being a controlled rotating body, and
the switching mechanism comprises a connecting part and a control unit, the connecting part is provided to one of the controlled rotating body and an opposing portion that opposes the controlled rotating body, the connecting part is movably arranged between a protruding position in which rotation of the controlled rotating body is regulated in at least one direction and a retracted position in which the rotation of the controlled rotating body is not regulated, and
the control unit is configured to move the connecting part from the protruding position to the retracted position by using the rotational force of the assist motor.

17. The bicycle drive unit as recited in claim 16, wherein the control unit is configured to press the connecting part and move the connecting part from the protruding position to the retracted position.

18. The bicycle drive unit as recited in claim 16, further comprising
additional connecting parts provided around a rotational axis of the controlled rotating body.

19. The bicycle drive unit as recited in claim 16, wherein the control unit comprises an annular member, which can be integrally rotated with one of the rotating bodies, excluding the controlled rotating body, from among the rotating bodies included in the transmission mechanism, and the annular member comprises a groove that becomes shallower in a radial direction toward one circumferential direction, in a portion that opposes the connecting part.

20. The bicycle drive unit as recited in claim 16, wherein the assist motor is connected to the one of the rotating body or on the upstream side of the one of the rotating body in the power transmission path.

21. The bicycle drive unit as recited in claim 1, wherein the input rotational shaft is a crankshaft to which a manual drive force is inputted.

22. The bicycle drive unit as recited in claim 21, wherein the assist motor is disposed radially outside of the crankshaft.

23. The bicycle drive unit as recited in claim 1, wherein the transmission mechanism comprises a first rotating body, a second rotating body, a third rotating body and a fourth rotating body,
the first rotating body is integrally rotated with the input rotational shaft,
the second rotating body is integrally rotated around a center axis whose position with respect to the input rotational shaft does not change and to which a rotation of the first rotating body is transmitted,
the third rotating body is integrally rotated with the second rotating body, and
the fourth rotating body to which the rotational force of the third rotating body is transmitted and which is integrally rotated with the output part, and
the switching mechanism comprises a connecting part and a control unit,
the connecting part is provided to an opposing portion that opposes one of the second rotating body and the third rotating body, and the connecting part is configured to be moved between a protruding position in which the rotation of one of the second rotating body and the third rotating body is regulated in at least one direction and a retracted position in which a rotation of one of the second rotating body and the third rotating body is not regulated, and
the control unit is configured move the connecting part from the protruding position to the retracted position by using the rotational force of the assist motor.

* * * * *